Figure 3:
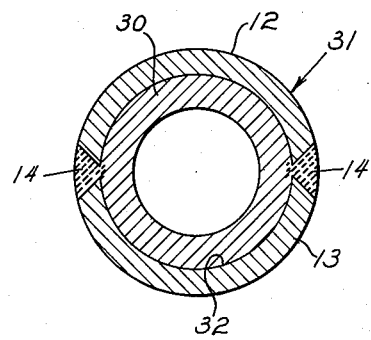

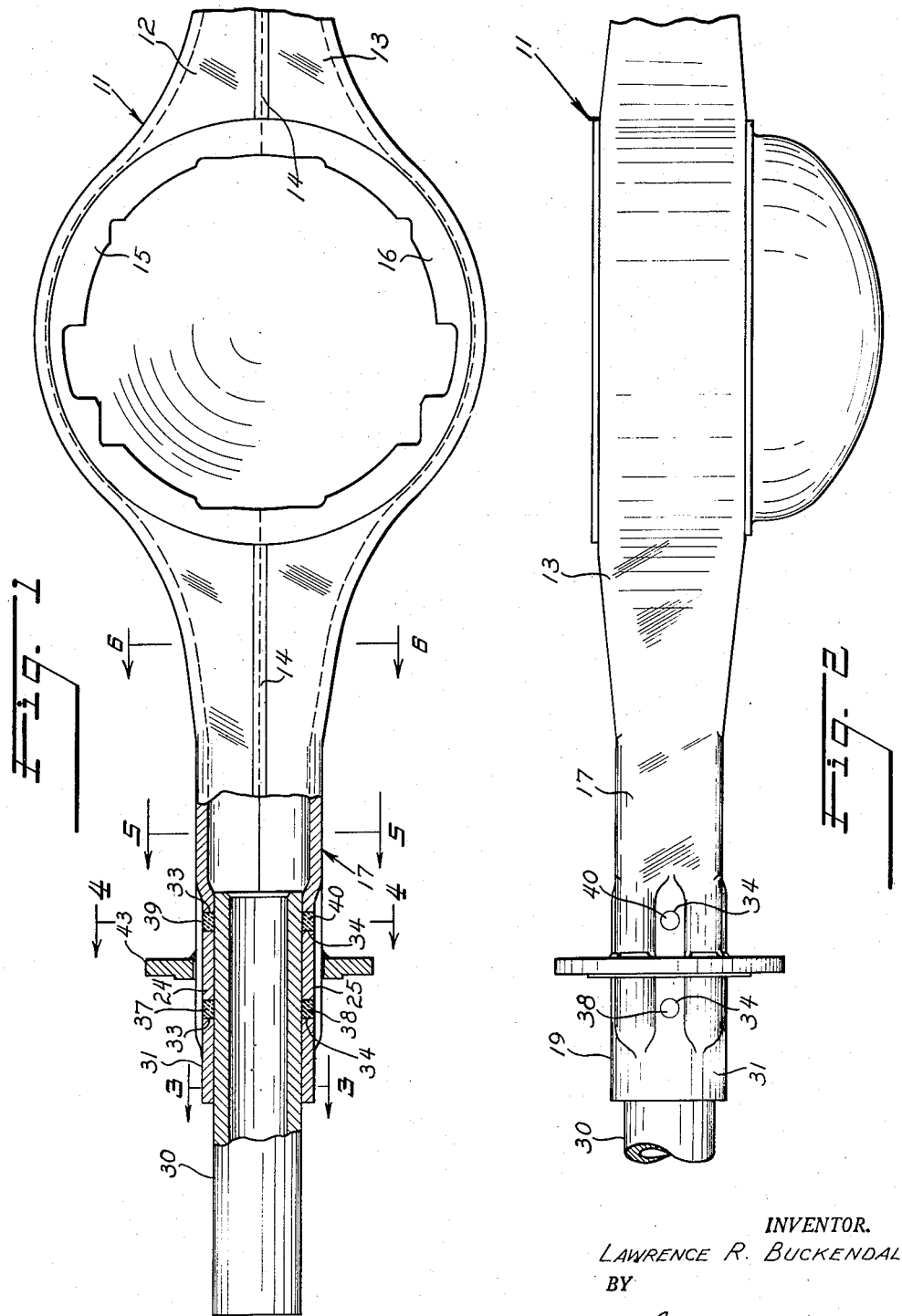

Oct. 2, 1951 L. R. BUCKENDALE 2,569,452
FLUTED AXLE HOUSING
Filed July 24, 1947 2 Sheets-Sheet 2

INVENTOR.
LAWRENCE R. BUCKENDALE
BY
Strauch + Hoffman
ATTORNEYS

Patented Oct. 2, 1951

2,569,452

UNITED STATES PATENT OFFICE 2,569,452

FLUTED AXLE HOUSING

Lawrence R. Buckendale, Detroit, Mich., assignor to The Timken-Detroit Axle Company, Detroit, Mich., a corporation of Ohio Application July 24, 1947, Serial No. 763,355

5 Claims. (Cl. 74—607)

This present invention relates to axle housings, and is particularly concerned with axle housings wherein hollow axle arms are formed to adequately support inserted wheel bearing sleeves.

In its preferred embodiment, the invention will be described as applied to a drive axle housing formed at its outer ends to receive inserted cylindrical wheel bearing sleeves which are permanently joined thereto so that the whole constitutes a rigid, substantially integral axle housing assembly.

It has heretofore been proposed to mount sleeves or tubular extensions in the ends of hollow axle housing arms, various methods of support of securing the sleeves and housing arms together having been suggested. Many of these earlier constructions have been impractical in that insufficient areas of support and attachment were provided for the inserted sleeve. In some of the earlier structures it was proposed to provide the outer ends of the housing arms with cylindrical formations which provide full surface contact with the inserted wheel bearing sleeves, but the chief objection to this arrangement is that it is very difficult to evenly machine the interior of the housing and the exterior of the sleeve so as to get an accurately interfitting housing and sleeve arrangement. Also where the housing was originally made rectangular in cross-section to increase its load bearing capacity for a given amount of metal, this provision of a circular cross-section region in the housing weakened the housing in that region and reduced its resistance to bending under load.

The present invention represents an improvement over such earlier constructions in that the axle housing arms are shaped to provide adequate support for the inserted length of the wheel bearing sleeves without sacrificing the load resisting qualities of the axle housing, to provide a readily fabricated, permanently joined final construction which is light, strong and inexpensive to manufacture.

It is, therefore, the major object of the invention to provide an axle housing having oppositely extending tubular arms of novel construction for adequate longitudinal and circumferential support for an inserted bearing sleeve at each end of the housing without sacrificing the load bearing characteristics of the housing.

A further object of the invention is to provide a hollow axle housing of generally rectangular cross-section with fluted end portions formed to provide arcuate support areas for an inserted wheel bearing sleeve.

It is a further object of the invention to provide a novel axle housing wherein the center portion comprises upper and lower similar channel members joined along their adjacent longitudinal edges by a permanent seam weld and formed at their outer ends to provide a plurality of wheel bearing sleeve support areas lying in a cylindrical envelope and which give an adequately large area of contact between the housing and the sleeve for proper support of the sleeve therewithin.

It is a further object of the invention to provide an axle housing having tubular, oppositely extending hollow arms basically rectangular in cross-section, in which the longer side dimension of the rectangle is in the direction of the depth of the housing, and formed at the ends of the arms for receiving inserted cylindrical wheel bearing sleeves, one pair of the opposing sides of each rectangular portion being intermediately depressed and the other pair of opposing sides of each rectangular portion being intermediately bulged in such a manner that all sides of the rectangular portions have adequately large areas of contact with the sleeves.

A further object of the invention is to provide an axle housing composed of two channeled center section members joined along adjacent longitudinal edges by a seam weld and formed at opposite ends with integral, internally facing arcuate formations providing large area support for inserted wheel bearing sleeves, with the seam welds penetrating into the sleeves for aiding in permanently bonding the sleeves to the housing.

A further object of the invention is to provide an axle housing having oppositely extending tubular arms with the outer portions of said arms substantially rectangular in cross-section, and having spring seat portions formed with substantially square thickened corners, and formed beyond the spring seat areas with deformed wall portions providing internal wheel bearing sleeve support areas lying in a cylindrical envelope corresponding to the periphery of the wheel bearing sleeve and providing adequate support for the wheel bearing sleeves without sacrificing the load carrying characteristics of the housing.

Further objects of the invention will become apparent as the specification proceeds with reference to the appended claims and the annexed drawings, wherein:

Figure 1 is a front elevation, partly broken away and in section, of a drive axle housing formed according to a preferred embodiment of my invention, and illustrating the inserted sleeve at one end thereof;

Figure 2 is a top plan view of the axle housing of Figure 1, illustrating particularly the external formation of the housing at the wheel bearing sleeve support end thereof; and Figures 3, 4, 5, and 6 are sections substantially along lines 3—3, 4—4, 5—5 and 6—6, respectively, of Figure 1, illustrating internal construction within the axle housing assembly.

Figure 6:
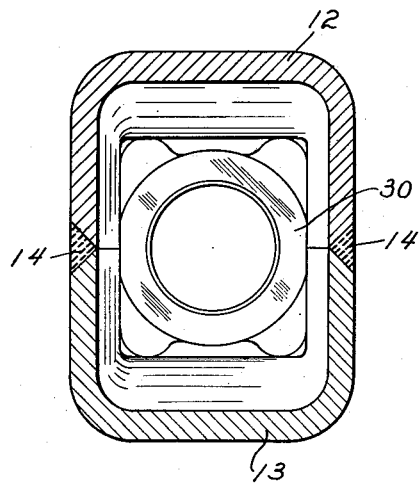
Figure 5:
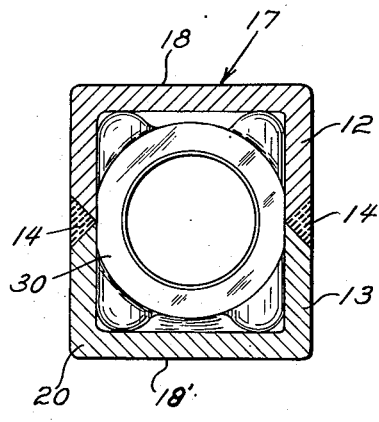

With reference to the drawings, wherein like numerals designate like parts throughout the several illustrations, a preferred embodiment of my invention comprises an axle housing having a central portion 11 made up of upper and lower housing portions 12 and 13 that are preferably identical and secured together along adjacent edges in a substantially horizontal plane which, as indicated in Figures 1 and 6, passes through the axis of rotation of the axle shaft of the housing, and this connection comprises longitudinal seam welds indicated at 14. Intermediate the ends of the central housing portion 11 is formed an enlarged differential receiving space bounded by the bowed intermediate parts 15 and 16 of the similar housing portions and formed on opposite sides with gear carrier and bowl attachment flanges similar to that disclosed in Wilber Patent 2,204,287, issued July 11, 1940.

Each of housing portions 12 and 13 is preferably identical and similarly formed of sheet steel, so that they may be made with the same sequence of forging operations, and any two of them selected and joined together to form the center section assembly 11 illustrated in Figure 1. During forging, each housing portion 12 and 13 is forged into a generally rectangular trough in cross section, as illustrated best in Figure 6, so that when the two parts 12 and 13 are joined together by weld 14, the housing has a rectangular configuration which is deepest in the vertical direction, to thereby provide maximum load bearing characteristics for the amount of metal used in the housing. As illustrated in Figure 6, the housing corners in this region are rounded and of the same thickness as the side walls. Housing portion 11 tapers toward a flat spring portion indicated at 17 in Figures 1, 2 and 5. At this spring seat portion, each of the housing portions 12 and 13 before welding is placed in suitable dies, and the side walls upset by pounding downwardly on the upstanding edges while confining the side walls against thickening, whereby the rounded contours of the corners of Figure 6 are forged to the thickened square corner construction of Figure 5, excess metal being displaced from the walls to provide these thickened corners, and flat surfaces 18 and 18' of large attachment area for the spring seat are provided. The thickened corners, one being designated at 29, are of appreciably greater cross section than the adjacent intersecting walls of the housing, and are thereby stronger. This novel spring seat construction is claimed in my copending application Serial No. 552,507, filed September 2, 1944, now Patent No. 2,480,833, to which reference is made for further detail.

Beyond the spring seat 17, the axle housing is formed with a wheel bearing sleeve support region 19 which is suitably forged with properly shaped dies to provide internal wheel bearing sleeve periphery contacting areas of sufficient area and proper disposition to adequately support the sleeve and prevent it from rotation or rocking in the housing, and at the same time retain the generally rectangular shape of the housing so as not to appreciably alter the section modulus or impair the load carrying characteristics of the axle housing gained by that shape.

In the present invention, I form flutes in the housing side walls which provide a plurality of adequately wide curved internal sleeve support surface areas which lie substantially in a cylindrical envelope, so as to avoid such concentration of stresses that might be present where the support areas are smaller. It is this provision of such large areas which avoid concentration of stresses, but which generally preserves the section modulus of the axle housing, while giving adequate support area for the wheel bearing sleeves, and enabling them to be bonded to the housing, which is a very important part of the invention. Sleeve 30 is a hollow cylindrical tube supported over about half its length in the housing.

In the fluted sleeve support region 19, the housing is of generally rectangular construction of about the same depth as the spring seat region 17, but with rounded corners 21 similarly to the section of Figure 6 at the intersections of the substantially vertically disposed side walls 22 and 23 and the substantially horizontally disposed top and bottom walls 24 and 25. Walls 22—25 are further formed in suitable forging dies to provide a plurality of arcuate wheel bearing sleeve support areas 26, 27, 28, and 29. In the illustrated example, where the external diameter of sleeve 30 is greater than the internal distance across the housing and less than the internal depth of the housing, side walls 22 and 23 are bulged outwardly and walls 24 and 25 are depressed inwardly until areas 26—29 lie in a common cylindrical envelope corresponding to the external periphery of sleeve 30. These curvatures are preferably imparted to the housing walls before welding the housing halves 12 and 13 together.

At the outer terminal of each region 19, the housing arms are formed to provide a cylindrical region 31 having an internal surface 32 (Figure 3) adapted to completely enclose the adjacent portion of sleeve 30 in full surface contact.

The housing halves 12 and 13, after being forged to the required shapes, are provided with rivet weld holes 33 and 34 respectively, and the adjacent edges of each which are adapted to contact are beveled as illustrated to provide V-channels 35 and 36 at opposite sides of the assembly for convenience in welding as will appear.

Figure 4:
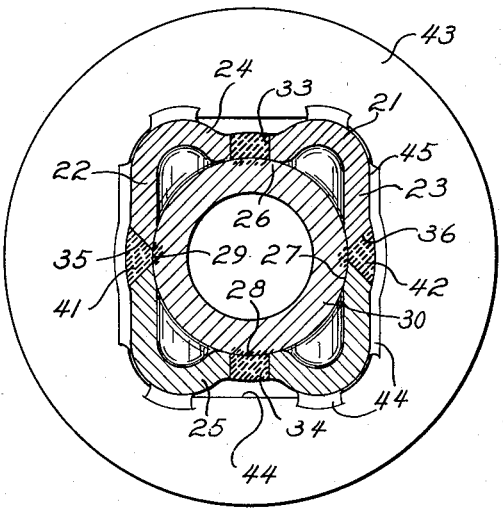

The housing halves 12 and 13, with sleeves 30 inserted at opposite ends and the parts in the relation of Figure 1, are clamped in a suitable welding jig. The rivet welds 37—40 are then made in holes 33 and 34 to bond the sleeve 30 to walls 24 and 25 and the seam welds 41 and 42 are made along channels 35 and 36 to bond the housing halves together. As illustrated in Figure 4, the inner ends of seam welds 41 and 42 penetrate the sleeve 30 and thus sleeve 30 is welded along both sides to side walls 22 and 23 of the housing. Should any of surfaces 26—29 be slightly out of round or not in exact full surface engagement with sleeve 30, within the usual manufacturing tolerances, such will be more than compensated by the large areas of bonding between the sleeve and housing.

Thus each sleeve 30 is mounted for about half its length within the associated tubular housing arm, with large internal surface areas of the housing provided material support surface for the sleeve without appreciably changing the section modulus of the housing. The sleeves 30 are permanently welded to the housing and the assembly is as rigid and strong as if sleeves 30 were integral with the housing.

A brake adapter 43 flange comprising a disc of plate steel lying in a substantially transverse plane with respect to said axle axis is mounted on the housing at each region 19, being provided with a central aperture 44 for embracing the housing sides and corners and is secured to the housing by weld beads 45. The brake flange is preferably located so that the plane in which it lies passes through the supported length of wheel bearing sleeve 30.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the equivalency of the claims are therefore intended to be embraced therein.

What is claimed and desired to be secured by United States Letters Patent is:

1. An axle housing having tubular arms of substantially rectangular cross section, wheel bearing sleeve support portions at the outer ends of said arms, housing walls in said wheel bearing sleeve support portions formed with circumferentially spaced internally concave surfaces of substantial area, the midpoints of the surfaces on one pair of walls being disposed in a substantially vertical plane and the midpoints of the surfaces on the other pair of walls being disposed in a substantially horizontal plane, cylindrical wheel bearing sleeves having their inner ends mounted in said support portions in peripheral contact with said surfaces, and means permanently welding said sleeves to said support portions at said surfaces.

2. The axle housing defined in claim 1 wherein one pair of opposing walls is depressed and the other pair of opposing walls is bulged to form said concave surfaces.

3. An axle housing made of upper and lower channel members welded together along coextensive contacting longitudinal edges and providing tubular arms of substantially rectangular cross section having vertically disposed side walls and horizontally disposed top and bottom walls, cylindrical wheel bearing sleeves having their inner ends inserted within said arms, and means for supporting and securing said sleeves in said arms comprising a plurality of circumferentially spaced internally concave surfaces of substantial area formed within said arms by the deformation of each of said walls, the surfaces in the said side walls being formed adjacent said longitudinal edges of said channel members, and said sleeves being welded to said housing arms at said surfaces.

4. An axle housing as defined in claim 3 wherein the said welds joining said longitudinal edges are disposed in a horizontal plane, and said sleeves are bonded to said housing side walls by penetrations thereinto of said welds.

5. An axle housing having tubular arms of substantially rectangular cross section, the side walls of said arms being adapted to be disposed vertically in the installed position of the housing, circumferentially spaced internally concave surfaces of substantial area formed in each of the walls adjacent the midpoint thereof, cylindrical wheel bearing sleeves inserted into said arms, and means securing said sleeves to said housing at said surfaces.

LAWRENCE R. BUCKENDALE.

REFERENCES CITED

The following references are of record in the file of this patent:

UNITED STATES PATENTS

| Number | Name | Date |
|---|---|---|
| 1,108,114 | Alden | Aug. 25, 1914 |
| 1,209,134 | Dodge | Dec. 19, 1916 |
| 1,403,500 | Huff | Jan. 17, 1922 |
| 1,583,789 | Goode | May 11, 1926 |
| 1,880,305 | Williams | Oct. 4, 1932 |
| 2,204,287 | Wilber | June 11, 1940 |